United States Patent [19]

Ims

[11] Patent Number: 4,630,068

[45] Date of Patent: Dec. 16, 1986

[54] HIGH SPEED THERMAL PRINTING CIRCUIT

[75] Inventor: J. Robert Ims, Portsmouth, R.I.

[73] Assignee: Raytheon Company, Lexington, Mass.

[21] Appl. No.: 782,665

[22] Filed: Sep. 30, 1985

[51] Int. Cl.[4] .............................................. G01D 15/10

[52] U.S. Cl. ................................ 346/76 PH; 364/519; 400/120

[58] Field of Search .................... 346/76 PH; 364/519; 400/120; 219/216 PH

[56] References Cited

FOREIGN PATENT DOCUMENTS 0130379 10/1981 Japan .............................. 346/76 PH

*Primary Examiner*—Arthur G. Evans

*Attorney, Agent, or Firm*—Martin M. Santa; Richard M. Sharkansky

[57] ABSTRACT

A thermal head drive circuit with the input connected to a source of printing data and the output connected to a thermal head including a linear array of heater elements improves the printing speed of a thermal head recording apparatus when printing successive lines. Improved printing speed is effected by simultaneously energizing each heater element with the time of energization for any one heater element being determined by the shade of gray to be produced by that one heater element.

8 Claims, 5 Drawing Figures

HIGH SPEED THERMAL PRINTING CIRCUIT

BACKGROUND OF THE INVENTION

The present invention relates to a thermal head drive circuit for use in a thermal recording apparatus such as facimile equipment or a printer. More particularly, the invention relates to apparatus for controlling the electrical energy provided to each heating element in the thermal head in order to provide a plurality of gray shades in a picture reproduced from an electrical signal upon a thermally sensitive paper.

Thermal recording apparatus, in which recording is thermally produced by using a thermal-sensitive recording paper or other thermal-sensitive medium, is widely used in facimile equipment. In such a thermal recording apparatus, a thermal head is used for printing in which there is a linear array of individually actuatable heater elements. Thermal energy to each of the heater elements is individually controlled to determine the density of the dot-like region at the point where the heating element and the recording paper are in contact. Shades of gray between white and black inclusive, typically as many as 16 shades of gray, may be obtained by controlling the time duration of a voltage applied to each of the heating elements. In the prior art, all elements which were desired to print the same shade of gray were energized simultaneously for the required pulse duration to produce the desired shade of gray. After completion of printing of that gray shade, the pulse duration of the applied energy is reduced and applied to all heating elements under which the adjacent shade of gray was to be printed. This process of changing the pulse length of the applied energy was continued through 16 cycles thereby providing the range of black to white in 16 shades of gray. This process of printing the 16 shades of gray in a sequential manner results in a printing technique which is slower than is desirable. Consequently, a need exists for improvements in thermal head drive circuits of the type in which thermal energy is supplied to respective heater elements to obtain faster printing.

SUMMARY OF THE INVENTION

The present invention provides a thermal head drive circuit which multiplexes the energization of the plurality of heating elements in the thermal head to provide multiplexed gray scale recording. The apparatus provides serial multibit data to each heating element in accordance with the density of the gray shade to be recorded by each element. The heating elements which are to produce the darkest shades of gray are energized prior to the next lighter shade and so on for the number of gray shades to be printed, typically 16 shades of gray (from black to white). Because of thermal time constants and cooling effects ocurring between energization pulses, the difference in the time of energization of the heating elements which produce adjacent shades of gray is not uniform and the circuitry compensates for this non-uniformity.

This invention provides apparatus which is capable of printing the same number of shades of gray as in the prior art but in a time substantially less than is required in the prior art. The time for recording a picture having the same number of gray scales as in the prior art is substantially halved by using the technique of this invention for energizing the heating elements. In particular, the apparatus of this invention reduces the amount of time required for printing by producing a plurality of serial voltage pulses where the number of pulses of the plurality going to each heating element is controlled in order to determine the energy applied to each heating element and as a consequence the gray scale produced by each heating element. This process may be termed "multiplexing".

It is a further object of this invention that the speed of recording be substantially increased without substantially increasing the complexity of the circuitry or the cost of the circuitry relative to that of the prior art.

BRIEF DESCRIPTION OF THE DRAWINGS

The aforementioned aspects and other features of the invention are explained in the following description taken in conjunction with the accompanying drawings wherein.

DESCRIPTION OF THE PREFERRED EMBODIMENT

Figure 1:
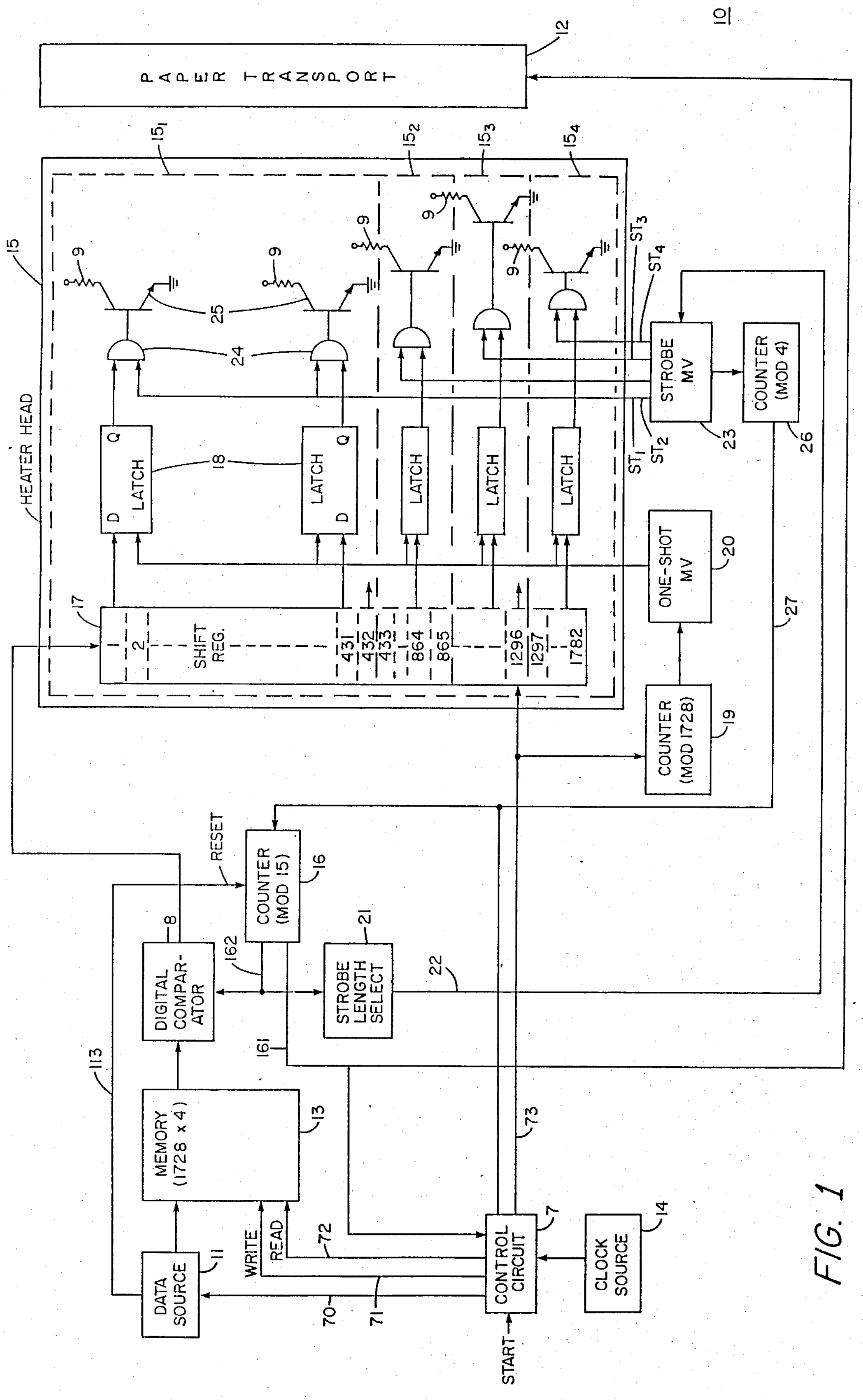
FIG. 1 is a block diagram of the drive circuit of this invention.

The thermal head drive circuit 10 of this invention is shown in the block diagram of FIG. 1. The data provided by the data source 11 is a four-bit word representing the 16 gray levels of a 4×8 mil region of a line which is to be printed by the drive circuit 10 in conjunction with the thermally-sensitive paper of paper drive 12. The data source 11 is clocked out to provide 1728 four-bit words (zero to fifteen) corresponding to the 1728 gray scale regions of a line of visible data in the recorder in response to a START signal provided to control circuit 7 which in turn provides clock signals on line 70 to data source 11. These 1728 four-bit words are written into sequential addresses of the memory 13 in response to a write signal and addresses data from the control circuit 7 in response to clock pulses from the clock source 14. The number 1728 is chosen because the commercially available thermal heater head 15 has 1728 heating elements 9 uniformly spaced along a line of the recorder.

The data source 11 terminates writing after the 1728 words have been entered into the memory 13. The 1728 words constitute a line of gray shade recording. A print cycle begins with the four-bit words of the memory 13 being serially clocked out of the memory by a read signal and address data from control circuit 7 on line 71 in response to the clock pulses from source 14 as 1728 sets of four-bit words. Thus, each of the four bits of a word are read out of the memory 13 in parallel. Each four-bit word is applied serially to the digital comparator 8 whose other input is a four-bit word provided by control counter 16 (modulo 15). The counter 16 is reset to "15" by the "end-of-data line" signal on line 113 provided by the data source 11 after source 11 has clocked in the data to memory 13. When the counter 16 is reset, the binary number which it presents to the digital comparator 8 on line 162 is the number "15", i.e., $(1111)_2$. The digital comparator 8 provides a "one" output when the number presented to the digital comparator from memory 13 is equal to or greater than that of the control counter 16. Thus, as the 1728, four-bit words stored in addresses of the memory 13 are sequentially read out to the digital comparator 8, the output of the comparator 8 is a sequence of 1728 bits, each bit being either a one or a zero, the ones occurring at those memory addresses where the number "15" has been stored ("15" being the count of counter 16). The number "15" which has been provided by the source 11 to memory 13 designates that the gray shade to be provided on the recorder paper is the darkest shade of gray (black) which will occur under those heating elements 9 corresponding in position along the linear array of elements 9 to the addresses from which the number "15" was read out of the memory 13. The ones and zeros which are provided serially at the output of the digital comparator 8 are read serially into a 1728-bit shift register 17 where they are stored until being parallel loaded into corresponding latches 18, only some of which are shown in FIG. 1. Shift (clock) pulses for register 17 are provided by control circuit 7 on line 73. There are as many latches as there are serial stages in shift register 17 and heating elements 9 in one line of heating elements (1728 in this illustration) of the heater head 15. A counter 19 (modulo 1728 ) is responsive to the clock pulses on line 73 and at the count of 1728 (after all 1728, four-bit words have been read from memory 13) provides a pulse to a one-shot multivibrator 20 which energizes the latches 18 and loads into each latch 18 the one or zero contained at the corresponding stage of the shift register 17 to which it is connected. The heater head 15 contains 1728 linearly aligned heater elements 9 which are each connected through latch circuits 18, AND circuits 24, and transistors 25 to a different stage of shift register 17. One-quarter (432) of adjacent elements 9 constitute what is termed a "heater head segment".

Figure 2:
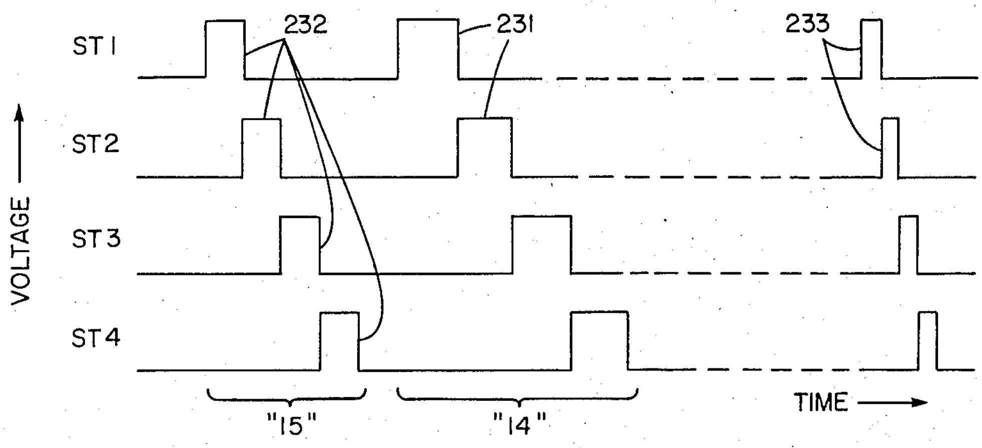
FIG. 2 is a timing diagram of strobe pulses which actuate the heating elements.

The number "15" contained in the counter 16 is also provided to a strobe length select circuit 21 which has an output 22 provided to the one-shot strobe multivibrator 23 which provides an output pulse on its output line $ST_1$ to each of the AND circuits 24 of heater head segment $15_1$ connected to their respective heating elements 9 through transistors 25. The other input to the AND circuits 24 is from its respective latch circuit 18 connected to stages 1–432 of shift register 17. At the conclusion of the strobe pulse $ST_1$, successive strobe pulses $ST_2$, $ST_3$ and $ST_4$ are generated by the one-shot multivibrator 23, each provided to heater head segments $15_2$, $15_3$, $15_4$, respectively, with each successive pulse being the same width as the pulse $ST_1$ which immediately preceded. The four sequential strobe pulses $ST_1$ through $ST_4$ are required because of thermal limitations of the heater head 15 so that only one-quarter of the elements 9 of the head 15, one heating head segment $15_1$, $15_2$, $15_3$, $15_4$, is able to be energized during a strobe pulse. Actuating each head segment in succession uses the bit data in the 1728 stages of register 17 and incrementally heats each element having a "one" input from register 17 across the width of the paper of drive 12. Each strobe pulse $ST_1$ through $ST_4$ of a group is of the same length for a given (gray shade) number "15", "14", etc., as shown in FIG. 2. It also should be noted that only those heater elements 9 whose respective latches 18 are in the one state will be energized and will produce a heating effect on the paper under the heating element 9 when the strobes $ST_1$ through $ST_4$ corresponding to the number "15" is applied to the respective AND circuits 24. Heating elements 9 actuated by the stobe pulse "15" will ultimately result in the gray shade "black" on the paper under the heating elements 9 so actuated. A counter 26 (modulo 4) produces an output pulse on line 27 at the conclusion of the four strobe pulses $ST_1$ through $ST_4$ of strobe one-shot multivibrator 23 to cause the count in the control counter 16 to count down to the number "14".

The control counter 16 now provides the new number "14" to the digital comparator 8 which is compared with the numbers read out of the 1728 memory addresses of memory 13. In order to accomplish this read out from memory 13, the control circuit 7 provides a read command on line 72 to the memory 13 in response to the pulse on line 27 from counter 27. As before, the number stored in each address of the memory 13 is compared by the digital comparator 8 to the count "14" provided by control counter 16. All numbers read out from the memory 13 equal to or greater than the number "14" provides a one at the corresponding address location of the shift register 17 in the same manner as described previously when the control counter 16 contained the number "15". The shift register 17 will contain more ones than previously because more ones will be provided by the digital comparator 8 because of the lower reference number "14" rather than "15". Thus, certain of the heating elements 9 which had not been actuated on the count "15" will now be actuated for the first time. These newly actuated heating elements will ultimately result in recording a gray shade which is one gray shade lighter than the gray shade (black) produced by the elements 9 which had previously been energized when the reference number was "15" and continue to be energized when the reference number is "14". The strobe length select circuit 21 is responsive to the count "14" from the control counter 16 and provides by way of line 22 the mechanism whereby the one-shot strobe multivibrator 23 generates a strobe pulse 231 for the count "14" which is slightly different in length from the length 232 of the strobe pulse produced during the time that the control counter contains the count "15". The slight difference in length of the pulses 231, 232 is occasioned by recording nonlinearity and cooling of the heating elements 9 as will be explained shortly. The strobe length select circuit 21 provides a different value of capacitance on line 22 connected to the timing circuit of the one-shot strobe multivibrator 23 for each different number "15", "14", . . . , "0" and hence, each group of pulses $ST_1$ through $ST_4$, although being the same within a group, will be different in accordance with the count contained in the control counter 16.

After the four strobes $ST_1$ through $ST_4$ which occur in sequence during the count "14" contained in control counter 16 have completed heating their respective heating elements 9, the counter 26 produces the pulse on line 27 which produces the next lower count "13" in control counter 16. The process described above continues for count "13" through the count "0" in control counter 16. At count "0", the count sequence is terminated. At the count "0" of counter 16, during which all the addresses of the memory 13 have been read fifteen times, the print cycle for one line of print is complete. Thus, for 16 shades of gray, including the extreme gray shades, black and white, the 15 sets of strobe pulses $ST_1$ through $ST_4$ for the count 15 through 1 produce the lightest shade of gray to the darkest shade of gray (black) in uniform gradations of gray. With the completion of the cycle at the count "0", the control counter 16 provides a pulse on line 161 to the control circuit 7 which provides a "write" signal on line 72 to the memory 13 and a signal on line 70 to cause data source 11 to read into the memory 13 a new set of data for the next line to be recorded. At the same time, the pulse on line 161 provides a signal to the paper transport 12 to advance the paper to the next line. The print cycle for one line of gray shades has been completed at this point and the circuit returns to its initial condition. The print process then continues with new data provided by source 11, as explained above, to record data in the 16 shades of gray on the successive lines of the paper.

Figure 3:
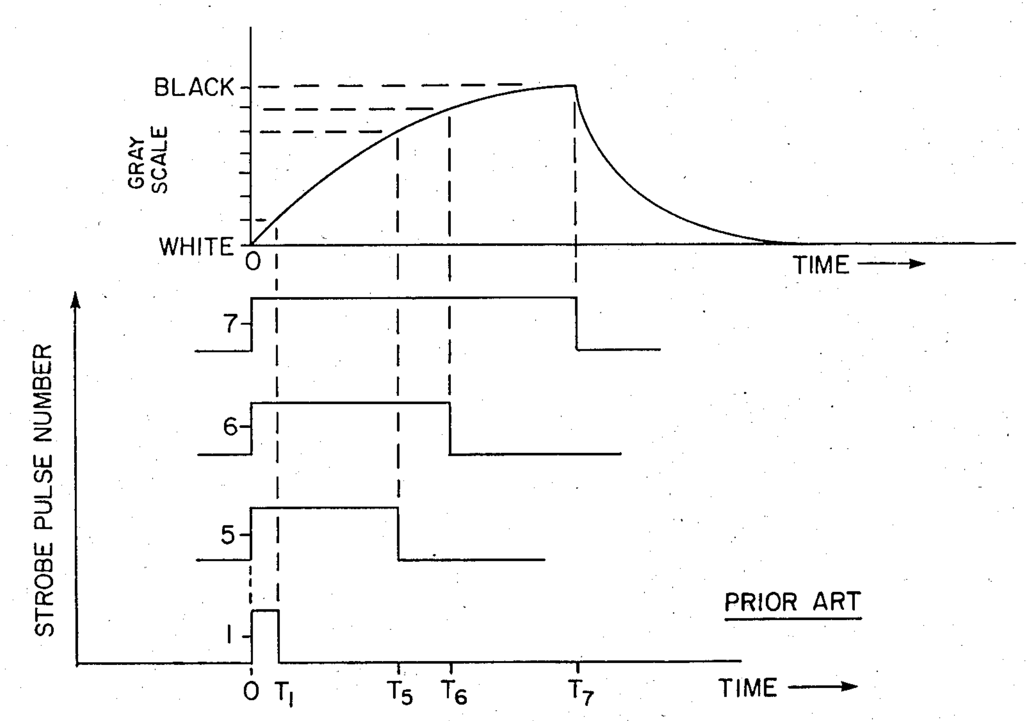
FIG. 3 shows the duration of the strobe pulses to obtain various shades of gray as a function of time of energization of the heater element by the process used in the prior art.

Referring now to FIG. 3, there is shown a plot of the time of energization of a heating element 9 to produce only eight uniformly separated shades of gray, ranging from white to black, on the thermally sensitive paper in accordance with the prior art. It is seen that the curve 30 depicting this relationship is nonlinear and that the time for producing equal increments of gray shades is different depending upon the shade of gray being considered. Thus, assuming that the pulses provided by the one-shot multivibrator 23 to any one particular heating element 9 as in this invention were provided with insignificant time intervals between the pulses, it is seen that the length of the first pulse 232 of FIG. 2 would correspond to the time difference $(T_7-T_6)$ of FIG. 3, the length of pulse 231 could correspond to the time difference $(T_6-T_5)$ and so on until the gray shade white is desired.

However, because the heating head 15 which energizes the recorder across a complete line of the recorder is organized into four segments $15_1$, $15_2$, $15_3$ and $15_4$, for reasons presented earlier, there is substantial time between the strobe heating pulses 232 and 231, and the following strobe pulses, applied to any one particular heating element. Therefore, the curve 30 of FIG. 3 must be modified to take into account the cooling effect which occurs in the heating element during the times at which energy is not being applied to that heating element. As a result, instead of the monotonic curve 30 of FIG. 3, the curve for producing uniform gradations of gray in eight shades from white to black, inclusive, looks similar to curves $40_1$, $40_2$ of FIG. 4 where heating pulses of length $t_1$, $t_2$, etc. of an element 9 are followed by periods of cooling. The cooling periods are three times as long as the preceding heating pulses because of the segmented arrangement of the heating head 15. Thus, in order to obtain uniform shades of gray between white and black, it is necessary to take into account the cooling effect between energization which results in the pulses 231, 232, etc. being different from the time difference of $T_7$ through $T_1$ of FIG. 3 where the heating is continuous. Curves $40_1$, $40_2$, respectively, represent the time required to print two successive lines containing as many as eight shades of gray along the length of the heating head 15. In contrast, reference to FIG. 5 shows the heating cycle of the prior art for one segment of elements of head 15. Curves 511 through 514, etc. and corresponding times $T_7$ through $T_4$, are for decreasing shades (from black to white) of gray printing. It is seen that more than two lines of print occur in less time (see FIG. 4) by using the method of the invention than is required for one line of print (see FIG. 5) by the method of the prior art.

Figure 4:
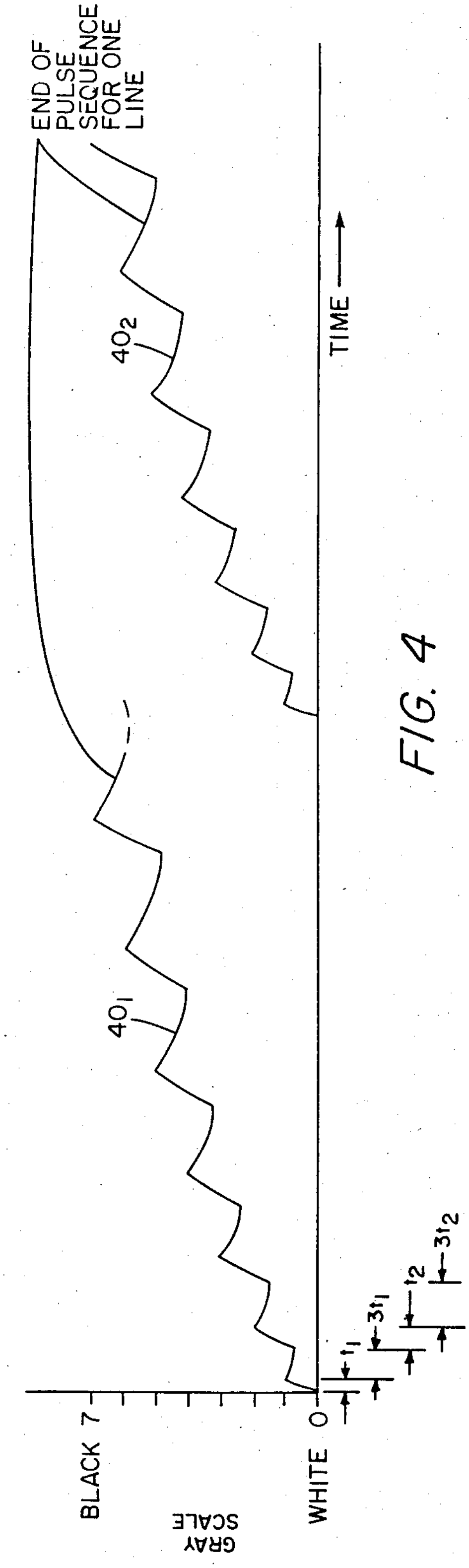
FIG. 4 shows the time duration of the strobe pulses as a function of their order in the sequence of strobe pulses to produce uniformly spaced shades of gray on the recording paper.
Figure 5:
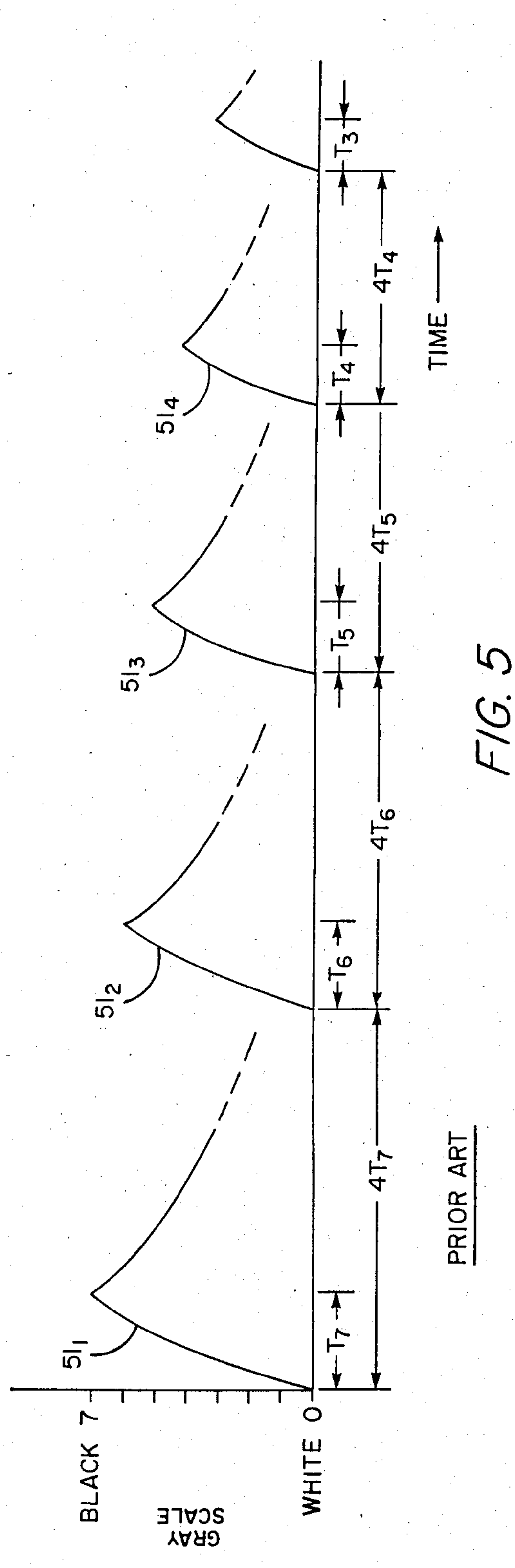
FIG. 5 shows the heater element energization of the prior art to produce uniformly spaced shades of gray.

In practice, instrumentation for measuring the density of the first gray shade #1 of FIG. 4 is used to determine the width of the last pulse 233 corresponding to the time $t_1$ of FIG. 4. The instrumentation is then set to detect gray shade #2 by applying a pulse length of time $t_1$, followed by a time interval of no energization of $3t_1$, followed by a period of pulse excitation $t_2$ to obtain gray shade #2. $t_2$ is the length of the next to the last pulse 231 of the sequence of pulses provided by the strobe generator. This process continues until the color black is obtained and, at that time, the width of each of the pulses of a pulse train of FIG. 2, namely, 232, 231, . . . , 233 are determined.

In order to make the presentation of the invention more simple, the invention has been described as having a single memory. Because only a single memory is employed, there will be a certain amount of time during which information is being transferred from the data source 11 into the memory 13 where there will be no new information being recorded upon the paper in the recorder. In the present example, since the information is fed into the memory only once for every 15 read outs of the memory, the duty factor is sufficiently high that there will be only a few percent diminution of the speed of recording relative to using a ping-pong type of memory, well known to those skilled in the art, wherein information is read into one memory while the second memory is being read out and vice versa. Even though only one memory 13 is used in the detailed description of this invention, the speed of printing using the invention is still approximately twice that of the prior art. Since the operation of ping-pong memories is so well known among those skilled in the art, it will be apparent to one so skilled how to modify the circuit of FIG. 1 in order to incorporate such a ping-pong memory and thereby increase the operation of the circuitry by several percent.

Printing heater heads exist which do not require that only some of their heating elements be heated at the same time by segmenting as in the preceding description of the preferred embodiment. In that event, the ratio of the speed of operation of the present invention relative to the prior art technique will be even greater than previously stated because of the absence of the cooling effect experienced by the elements of the segments while waiting for the elements of the remaining segments to be heated.

Having described a preferred embodiment of the invention, it will be apparent to one of skill in the art that other embodiments incorporating its concept may be used. It is felt, therefore, that this invention should not be limited to the disclosed embodiment but rather should be limited only by the spirit and scope of the appended claims.

What is claimed is:

1. A thermal head drive circuit with an input connected to a source of printing data, and an output connected to a thermal head including individually actuable and heatable heater elements for printing successive lines on thermally sensitive paper, comprising:

means comparing the amplitude of each of said printing data with a first predetermined value to provide a first plurality of first signals corresponding to each of said printing data when said amplitude is equal to or greater than said first predetermined value;

means applying each of said first plurality of first signals to its respective heater, and providing a predetermined duration of electrical energy to each of said heating elements;

means changing said first predetermined value to a second predetermined value of lesser amplitude than said first predetermined value, said comparing means providing a second plurality of first signals from said comparing means, and said applying means providing said second plurality of first signals to said heating elements;

said changing means providing successively smaller predetermined values to said comparing means to provide a succession of pluralities of first signals from said comparing means, said applying means successively applying said pluralities of first signals to said heating element.

2. A thermal head drive circuit with an input connected to a source of printing data, and an output connected to a thermal head including individually actuable and heatable heater elements for printing successive lines on thermally sensitive paper, comprising:

a memory having an initial condition of storage addresses storing said printing data from said source of printing data;

a counter having a first number;

a numerical comparator having inputs connected to said memory and said counter;

said comparator providing a sequence of signals each signal having a polarity determined by and corresponding to the number at each address of said memory relative to the first number provided by said counter;

a shift register for storing said sequence of signals;

a plurality of heater elements;

a plurality of pulse generating means, each one responsive to the polarity of one of said sequence of signals and pulse energizing one of said heater elements;

means responsive to the count of said counter determining the duration of the pulse from said pulse generating means;

means reducing the count of said counter after termination of said energizing pulse;

said comparator successively comparing said changed count with said memory address numbers to provide different successive sequences of signals in said shift register;

said register successively providing said successive sequence of signals to said pulse generating means;

said counter at count zero providing a pulse to said data source to provide new data to the addresses of said memory and resetting said counter to said first number to reestablish said initial condition.

3. A thermal head drive circuit with an input connected to a source of printing data, and an output connected to a thermal head including individually actuable and heatable heater elements for printing successive lines on thermally sensitive paper, comprising:

means for providing a sequence of predetermined values;

means comparing the amplitude of each of said printing data with a first predetermined value from said means for providing a sequence to provide a first plurality of first signals corresponding to each of said printing data when said data amplitude is equal to or greater than said first predetermined value;

means providing a first predetermined duration of electrical energy to each of said heating elements in response to each of said first signals and said predetermined value;

means changing said first predetermined value to a second predetermined value of different amplitude than said first predetermined value, said comparing means providing a second plurality of first signals from said comparing means, and said means providing energy corresponding to said second plurality of first signals and said second predetermined value to said heating elements;

said changing means providing successively different predetermined values to said comparing means to provide a succession of pluralities of first signals from said comparing means; and said means providing electrical energy to each of said heating elements successively applying said energy to said heating elements in response to said pluralities of first signals and said predetermined values.

4. The drive circuit of claim 3 comprising in addition first means for storing said printing data, and means providing said printing data from said first means for storing to said comparing means in time sequence to provide said pluralities of first signals; and second means storing said pluralities of first signals connected to said means providing energy.

5. The drive circuit of claim 3 comprising in addition means providing a sequence of strobe pulses whose lengths correspond to said predetermined values, said sequence of strobe pulses corresponding to said pluralities of first signals; and said means providing electrical energy in response to said predetermined values being responsive to said strobe pulse lengths.

6. The drive circuit of claim 5 wherein said means for applying a sequence of strobe pulses is responsive to said predetermined values from said means for providing a plurality of predetermined values in time sequence.

7. The drive circuit of claim 3 wherein said means for providing electrical energy provides electrical energy simultaneously to all heating elements corresponding to their respective first signals of each plurality.

8. The drive circuit of claim 2 comprising in addition means for serially reading-out the contents of the storage addresses of said memory in response to a change in the count of said counter.

* * * * *